H. Barton
Dumping-Wagon

Nº 76039

Patented Mar. 31, 1868.

Witnesses:
C. E. Waite
Frank S. Alden

Inventor:
Harvey Barton

United States Patent Office.

HARVEY BARTON, OF ELYRIA, OHIO.

Letters Patent No. 76,039, dated March 31, 1868; antedated March 25, 1868.

IMPROVEMENT IN DUMPING-WAGON.

*The Schedule referred to in these Letters Patent and making part of the same.*

TO ALL WHOM IT MAY CONCERN:

Be it known that I, HARVEY BARTON, of Elyria, in the county of Lorain, and State of Ohio, have invented certain new and useful Improvements in Dumping-Wagons; and I do hereby declare that the following is a full and complete description of the same, reference being had to the accompanying drawings, making a part of this specification, in which—

Figure 1:
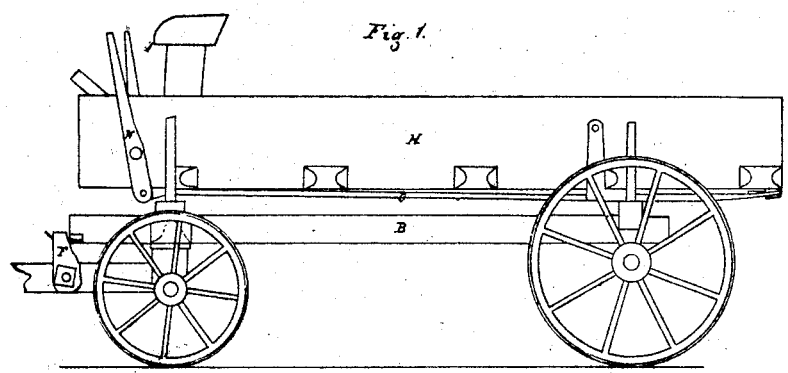
Figure 2:
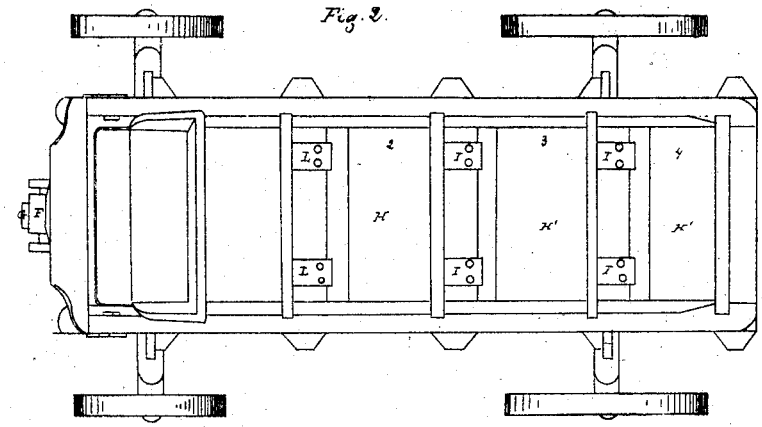
Figure 3:
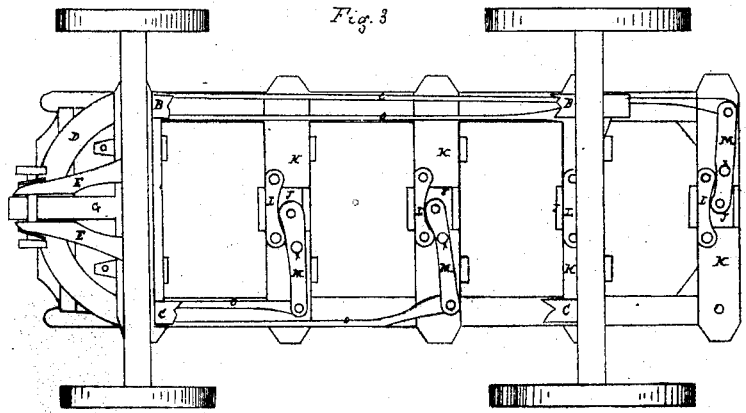

Figure 1 is a side view of the wagon.
Figure 2 is a view of the top.
Figure 3 is a view of the bottom.
Like letters of reference refer to like parts in the views.

A, fig. 1, is the carriage of the wagon, which, unlike the ordinary wagon, is provided with two reaches, B C, immediately under each side of the box, the front ends of which are connected to the bolster, instead of to the king-bolt. The hounds of this wagon are arranged in front, as shown at D, fig. 3. E are the brackets, in which the pole is secured, and F a yoke, by which they are supported by the hound, said yoke being held upon the end of a short reach, G, the inner end of which is secured to the king-bolt, and the other rests upon the swing-bar of the hounds, on the protruding end of which is hung the yoke, as above said. H, fig. 1, is the wagon-box, and which is divided into four sections, 1 2 3 4, as shown in fig. 2. Each of these sections is provided with an independent bottom, H', hung to the side of the section by the hinges I in such a way as to allow the bottom to open downward between the reaches B C, above referred to, and which are opened and closed by the following device, viz: J, fig. 3, are slides, secured to the cross-piece K by the strap L. M is a lever, pivoted to the cross-piece at the point $x$, and also pivoted to the slide, and which lever and slide are operated by the lever N, fig. 1, pivoted to the front end of the box, and connected to the lever M by the link O.

By this arrangement, it will be obvious that, as the lever N is pulled back toward the seat by the teamster, the result will be to throw forward the outer end of the lever M, and thus force back the slide J from under the bottom, by the reverse action of the opposite end of the lever, and thus let the bottom drop down, thereby discharging the dirt through the bottom of the box. The bottom of each section is provided with the same device for opening and shutting it, and which are all operated by the teamster without leaving his seat.

For greater convenience, two of the levers are arranged on each side of the box, within easy reach of the teamster, thereby placing immediately under his control the dumping of the wagon.

To each of the bottoms H may be connected a chain or rod, and extended to a point within reach of the driver's seat, by which the driver may be enabled to close the bottom, after the load is discharged, without leaving his seat. The driver can thus open and close the bottoms at will.

What I claim as my improvement, and desire to secure by Letters Patent, is—

1. The levers N M, links O, and slides J, as arranged, in combination with the bottoms H', in the manner as and for the purpose set forth.

2. The hound D, reach G, and yoke F, as arranged, in combination with the brackets E, for the purpose and in the manner set forth.

HARVEY BARTON.

Witnesses:
W. H. BURRIDGE,
J. HOLMES.